US011464352B2

(12) United States Patent
Truong et al.

(10) Patent No.: US 11,464,352 B2
(45) Date of Patent: Oct. 11, 2022

(54) FOOD STEAMER AND RACK SYSTEM

(71) Applicant: Meyer Intellectual Properties Limited, Hong Kong (CN)

(72) Inventors: Jacquelyn Maitram Truong, Woodland, CA (US); Xi Zheng, Hong Kong (CN)

(73) Assignee: Meyer Intellectual Properties Limited

( * ) Notice: Subject to any disclaimer, the term of this patent is extended or adjusted under 35 U.S.C. 154(b) by 974 days.

(21) Appl. No.: 16/215,967

(22) Filed: Dec. 11, 2018

(65) Prior Publication Data

US 2019/0110629 A1    Apr. 18, 2019

Related U.S. Application Data

(62) Division of application No. 15/371,651, filed on Dec. 7, 2016, now Pat. No. 10,165,889.

(60) Provisional application No. 62/420,154, filed on Nov. 10, 2016.

(51) Int. Cl.
| | |
|---|---|
| *A47J 27/04* | (2006.01) |
| *A47J 27/05* | (2006.01) |
| *A47J 27/06* | (2006.01) |
| *A47J 27/14* | (2006.01) |
| *A47J 36/06* | (2006.01) |

(52) U.S. Cl.
CPC ............... *A47J 27/04* (2013.01); *A47J 27/05* (2013.01); *A47J 36/06* (2013.01); *A47J 2027/043* (2013.01)

(58) Field of Classification Search
CPC ....... A23L 1/00; A47J 27/04–05; A47J 27/06; A47J 27/08; A47J 27/14–18

USPC .......................... 99/449; 126/373.1; 426/511
See application file for complete search history.

(56) References Cited

U.S. PATENT DOCUMENTS

| | | | |
|---|---|---|---|
| 4,528,975 A | 7/1985 | Wang | |
| 4,739,698 A | 4/1988 | Allaire | |
| 4,982,656 A | 1/1991 | Stone | |
| 5,195,424 A | 3/1993 | Guajaca | |

(Continued)

FOREIGN PATENT DOCUMENTS

| | | |
|---|---|---|
| CN | 2450998 Y | 10/2001 |
| CN | 2469843 Y | 1/2002 |

(Continued)

OTHER PUBLICATIONS

Search Report issued in connection with corresponding Chinese Patent Application No. 2017100642134.

(Continued)

*Primary Examiner* — Michael A Laflame, Jr.
(74) *Attorney, Agent, or Firm* — Akerman LLP

(57) ABSTRACT

A device and method for steaming and presenting of food deploys a spacer that rests on top of a cookware vessel. The spacer has a lower inner flange to support a steaming rack. A leg supported serving or presentation rack is adapted for lifting, supporting and presenting the steamed food when the spacer and steaming rack are lowered over it. The spacer has a larger inner diameter than an outer diameter of the presentation rack so that the spacer may be lowered around the presentation rack to engage the steaming rack along the presentation rack. The presentation rack has a sufficient height relative to the spacer height to dispose the food proximal to or above the rim of the spacer.

11 Claims, 4 Drawing Sheets

(56) References Cited

U.S. PATENT DOCUMENTS

| | | | |
|---|---|---|---|
| 5,400,701 | A | 3/1995 | Sham |
| 6,230,612 | B1 | 5/2001 | Rossi |
| 7,717,031 | B1 | 5/2010 | Cornfield |
| 8,025,007 | B1 | 9/2011 | Boyer |
| 8,772,685 | B2 | 7/2014 | Backaert et al. |
| 9,220,369 | B1 | 12/2015 | Yelverton |
| 9,676,539 | B2 | 6/2017 | Sloat et al. |
| 10,165,889 | B2 | 1/2019 | Truong et al. |
| 2011/0095031 | A1 | 4/2011 | Welk et al. |
| 2016/0066743 | A1 | 3/2016 | Prommel et al. |
| 2019/0110628 | A1* | 4/2019 | Lee ........................ A47J 27/004 |

FOREIGN PATENT DOCUMENTS

| | | |
|---|---|---|
| CN | 201267410 Y | 7/2009 |
| CN | 201303866 Y | 9/2009 |
| CN | 201658254 U | 12/2010 |
| CN | 201691720 U | 1/2011 |
| CN | 201691723 U | 1/2011 |
| CN | 201727376 U | 2/2011 |
| CN | 201929762 U | 8/2011 |
| CN | 201929764 U | 8/2011 |
| CN | 202198456 U | 4/2012 |
| CN | 202277275 U | 6/2012 |
| CN | 202408543 U | 9/2012 |
| CN | 202505069 U | 10/2012 |
| CN | 202761069 U | 3/2013 |
| CN | 202843361 U | 4/2013 |
| CN | 203122159 U | 8/2013 |
| CN | 203138118 U | 8/2013 |
| CN | 203168904 U | 9/2013 |
| CN | 203290713 U | 11/2013 |
| CN | 203861038 U | 10/2014 |
| CN | 104287631 A | 1/2015 |
| CN | 204158201 U | 2/2015 |
| CN | 204207604 U | 3/2015 |
| CN | 204483880 U | 7/2015 |
| CN | 204580958 U | 8/2015 |
| CN | 204765134 U | 11/2015 |
| CN | 204889592 U | 12/2015 |
| CN | 105411403 A | 3/2016 |
| CN | 205053757 U | 3/2016 |
| CN | 105581660 A | 5/2016 |
| GB | 2340387 A | 2/2000 |
| JP | 2000070162 A | 3/2000 |
| JP | 2000116523 A | 4/2000 |
| JP | 2012066044 A | 4/2012 |
| JP | 2016022387 A | 2/2016 |
| KR | 20110002116 A | 1/2011 |
| TW | M301624 U | 12/2006 |

OTHER PUBLICATIONS

Office Action issued in connection with corresponding Chinese Patent Application No. 2017100642134.
Search Report dated Aug. 1, 2017 in connection with corresponding Taiwan Patent Application No. 105143331 (with a translation of a portion of the Search Report).
U.S. Appl. No. 15/371,651, filed Dec. 7, 2016.
Search Report dated May 9, 2020, issued in connection with corresponding Chinese Patent Application No. 2017100642134.
Third Office Action dated Oct. 10, 2020, issued in connection with corresponding Chinese Patent Application No. 2017100642134.
Second Office Action dated May 18, 2020, issued in connection with corresponding Chinese Patent Application No. 2017100642134.
Office Action dated Feb. 10, 2020, issued in connection with corresponding Indonesian Patent Application No. P00201705722.
Search Report dated Oct. 13, 2020, issued in connection with corresponding Malaysian Patent Application No. PI 2017703473.
Modified Substantive Examination Adverse Report dated Oct. 13, 2020, issued in connection with corresponding Malaysian Patent Application No. PI 2017703473.

* cited by examiner

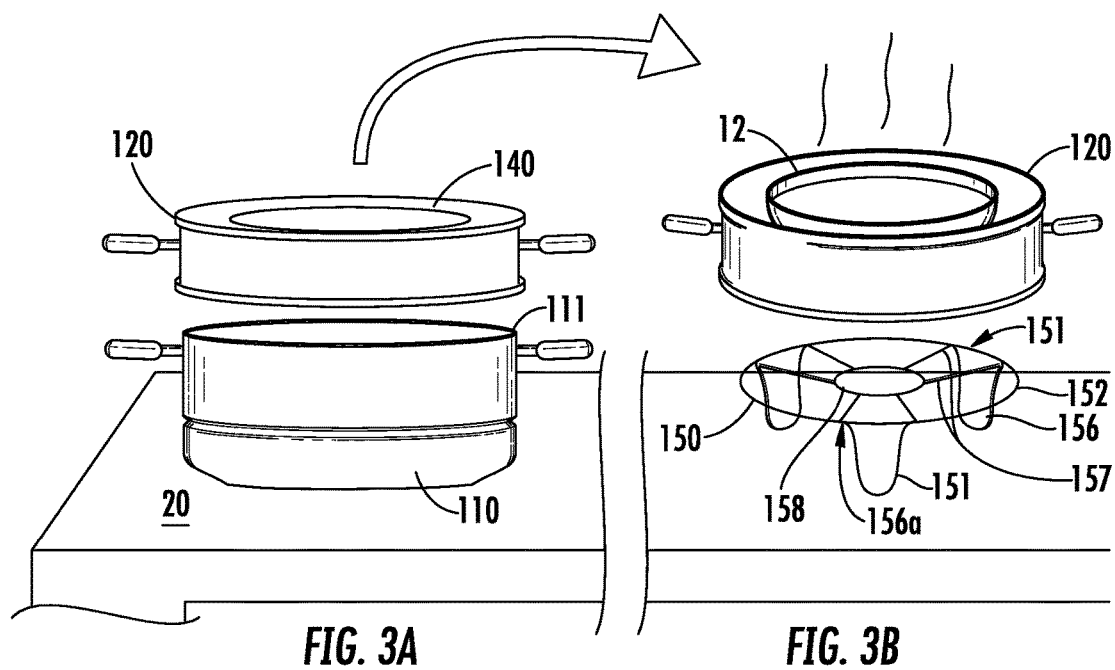
FIG. 3A
FIG. 3B
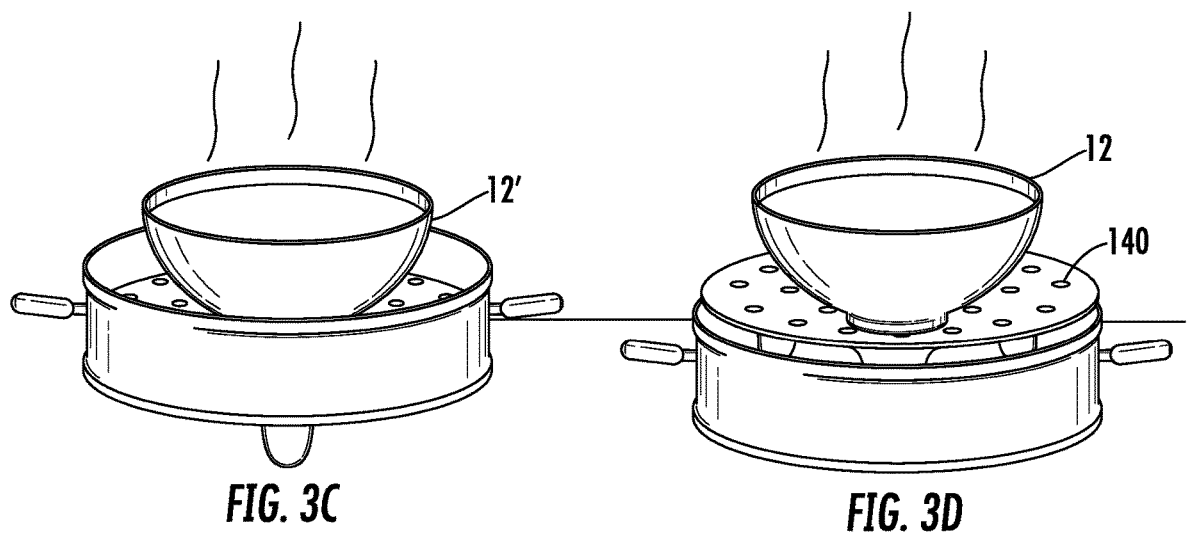
FIG. 3C
FIG. 3D

FOOD STEAMER AND RACK SYSTEM

CROSS-REFERENCE TO RELATED APPLICATIONS

This patent application is a divisional of U.S. patent application Ser. No. 15/371,651, filed Dec. 7, 2016, which claims the benefit of the filing date under 35 U.S.C. § 119(e) to U.S. Provisional Patent Application No. 62/420,154, filed on Nov. 10, 2016, the contents of both of which are hereby incorporated by reference in their entirety.

BACKGROUND

The present invention relates to cookware and components for steaming and serving steamed food.

Steaming foods is a well-developed and appreciated form of cooking in many cultures, particularly in Asia where steamed whole fish and other foods are popular. Steamers are commonly used to steam foods. Once steamed, many foods become rather delicate and removing them from the steamer vessel can disturb the appearance of the steamed food if not done carefully. The steamer vessel and food positioning insert are typically hot, so it is important for the server to protect their hands from heat. However, protective gloves limit manual dexterity, making it more difficult to carefully remove the delicate steamed foods.

SUMMARY

In one aspect, a cookware apparatus includes a vessel, a spacer, a perforated rack, and a support rack. The vessel includes a bottom and substantially upright sidewalls extending between the bottom and an upper rim of the vessel and is adapted to retain a fluid. The spacer is adapted to be selectively disposed on the vessel and includes one or more generally upright sidewalls forming a perimeter of the spacer and defining an interior hollow therebetween. When the spacer is disposed on the vessel, a lower rim of the spacer and the upper rim of the vessel may be in generally sealed engagement. The perforated rack is adapted to be selectively positioned within the hollow between the lower rim and an upper rim of the spacer. The perforated rack may stably engage a portion of the sidewall when positioned within the hollow. The support rack may define an outer perimeter positionable within the hollow of the spacer and is adapted to support the perforated rack when the spacer within which the perforated rack is positioned is lowered to surround at least an upper portion of the support rack.

In various configurations, the apparatus may further include a lid adapted to interchangeably seal and cover the vessel and the spacer. The sidewalls of the spacer may include a flange to support the perforated rack within the hollow and which may be positioned more proximate to the lower rim than the upper rim of the spacer. The support rack may include an upper frame and at least three legs that support the upper frame. The upper frame is adapted to supportively engage the perforated rack when the spacer is lowered. The legs may position the upper frame at a height greater than a height of the spacer.

In some configurations the apparatus may further include a second spacer and a second perforated rack. The second spacer may be adapted to be selectively disposed on the first spacer and include one or more generally upright sidewalls forming a perimeter of the second spacer and defining an interior hollow therebetween. A lower rim of the second spacer and the upper rim of the first spacer may be in generally sealed engagement when the spacers are stacked. The second perforated rack may be adapted to be selectively positioned within the hollow between the lower rim and an upper rim of the second spacer. The second perforated rack may stably engage a portion of the sidewall when positioned within the hollow. The support rack defines an outer perimeter positionable within the hollow of the second spacer and is adapted to support the second perforated rack when the second spacer within which the perforated rack is positioned is lowered to surround at least an upper portion of the support rack. The apparatus may further include a lid adapted to interchangeably seal and cover the vessel, the first spacer, and the second spacer. The sidewall of the second spacer may include a flange positioned below the lower rim and that extends interiorly with respect to the hollow to support the second perforated rack. The support rack may include an upper frame and at least three legs supporting the upper frame which supportively engages the perforated rack when the spacer within which the perforated rack is positioned is lowered. The legs may position the upper frame at a height greater than a height of the second spacer. The upper frame may include an annular support rim, spokes, and a central hub. The support rim may be connected to an upper portion of each leg, and the spokes may connect the support rim to the hub.

In another aspect, a method of using a steamer includes removing a lower rim of a spacer from an upper rim of a vessel adapted to generate steam; positioning the spacer above a support rack; and engaging a perforated rack removably retained within an interior hollow of the spacer by lowering the spacer to surround the support rack, wherein the support rack supports the perforated rack when engaged therewith.

In various configurations, the vessel may be adapted to retain a fluid and includes a bottom and substantially upright sidewalls extending between the bottom and the upper rim of the vessel. The spacer may include one or more generally upright sidewalls forming a perimeter of the spacer and defining the hollow therebetween. The spacer may be disposed on the vessel such that the lower rim of the spacer and the upper rim of the vessel are in generally sealed engagement. The perforated rack may stably engage a portion of the sidewall when positioned within the hollow. The sidewalls of the spacer may include a flange positioned more proximate to the lower rim than the upper rim and that extends interiorly with respect to the hollow. The flange may support the perforated rack when the perforated rack is positioned within the hollow. The support rack may include an upper frame and at least three legs that support the upper frame, wherein the upper frame supportively engages the perforated rack when the spacer is lowered to surround the support rack. The method may further include removing a lid from an upper rim of the spacer before removing the lower rim of the spacer from the upper rim of the vessel.

In some configurations, the method may further include removing a lower rim of a second spacer from an upper rim of the first spacer before positioning the first spacer above the first support rack; positioning the second spacer above a second support rack; and engaging a second perforated rack removably retained within an interior hollow of the second spacer by lowering the second spacer to surround the second support rack, wherein the second support rack supports the second perforated rack when engaged therewith. The second spacer may be adapted to be selectively disposed on the first spacer and include one or more generally upright sidewalls forming a perimeter of the second spacer and define an interior hollow therebetween. The second spacer may be disposed on the upper rim of the first spacer in generally sealed engagement. In one arrangement, the sidewall of the second spacer includes a flange positioned below the lower rim and that extends interiorly with respect to the hollow to support the second perforated rack when positioned therein. The second support rack may include an upper frame and at least three legs supporting the upper frame and supportively engage the second perforated rack when the second spacer is lowered. The legs may position the upper frame at a height greater than a height of the second spacer. The method may also include removing a lid from an upper rim of the second spacer before removing the lower rim of the second spacer from the upper rim of the first spacer.

BRIEF DESCRIPTION OF DRAWINGS

FIGS. 3A-3D illustrate steps in the process of using support rack of FIG. 2C for serving.

FIG. 4A is a cross-sectional illustration of another embodiment of using the support rack for serving, whereas

DETAILED DESCRIPTION

Figure 1:
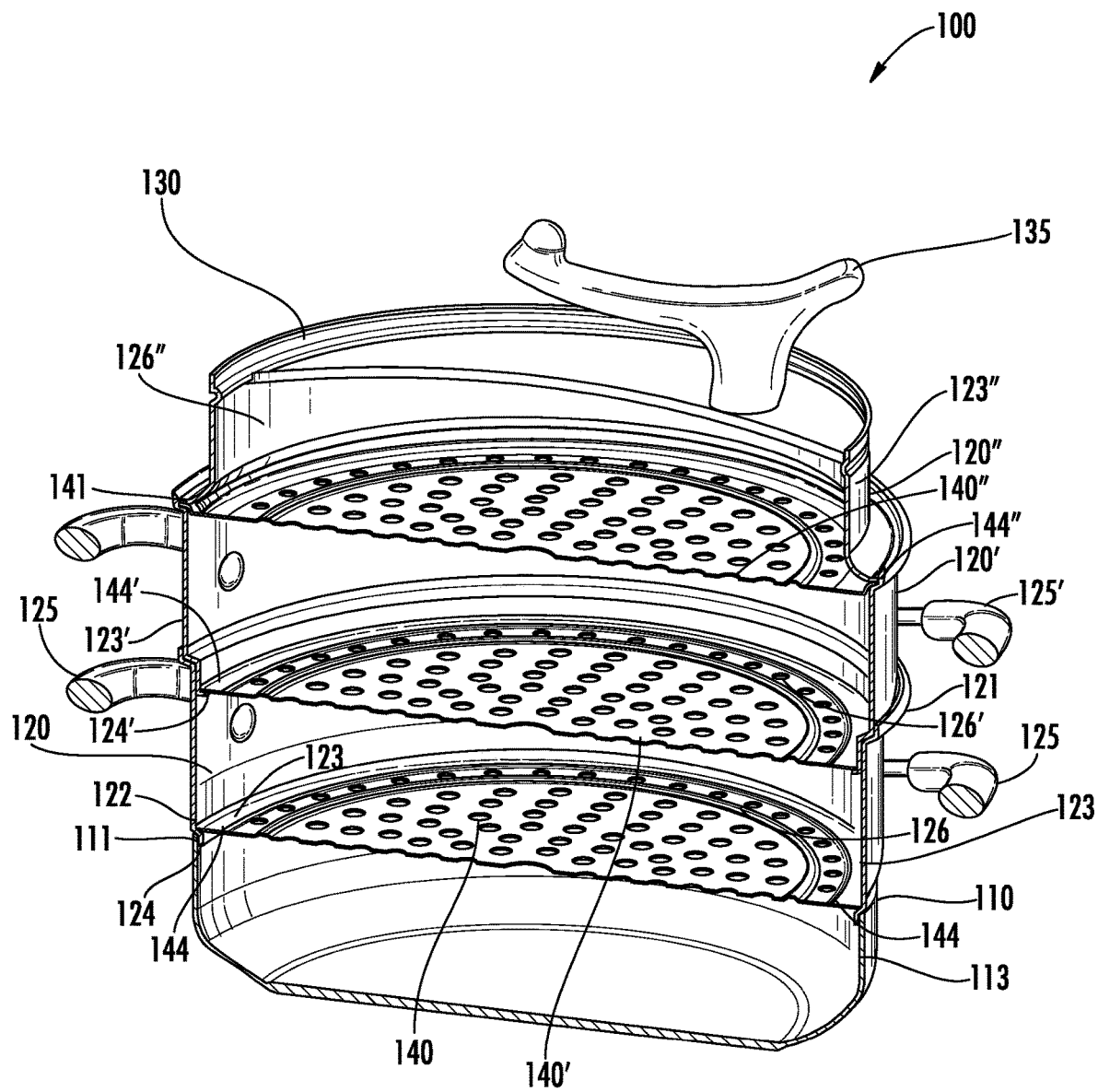
FIG. 1 is a perspective cross-section illustration of the steamer system as assembled for cooking.
Figure 2A:
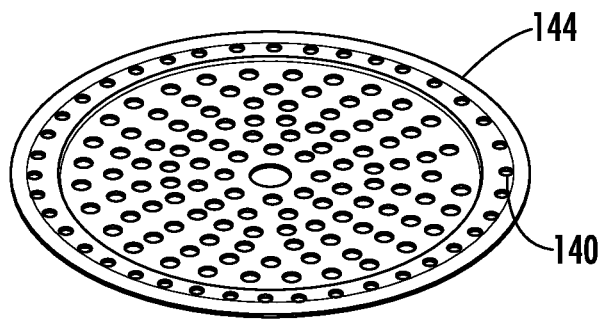
FIGS. 2A-C are perspective views of select components of FIG. 1 and a food support rack that can be used for removal of food and serving.
Figure 2B:
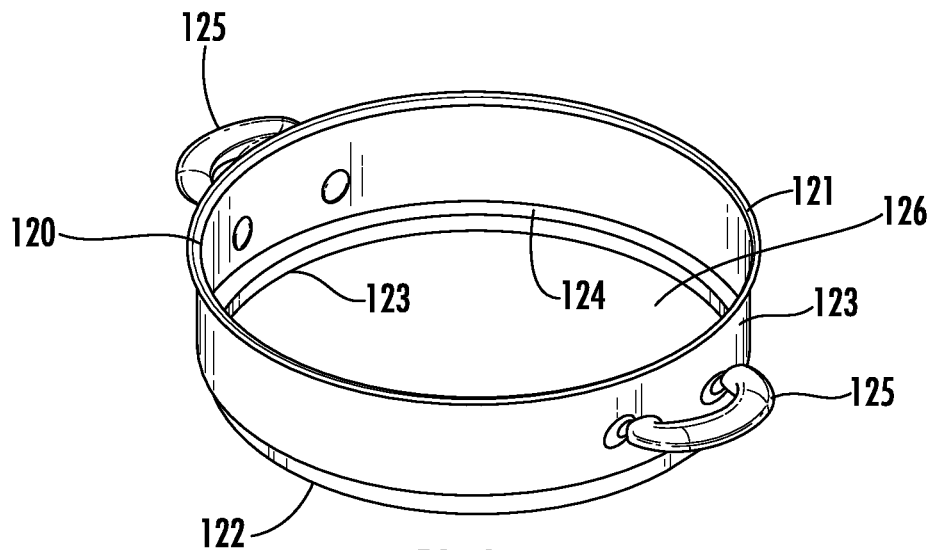
Figure 2C:
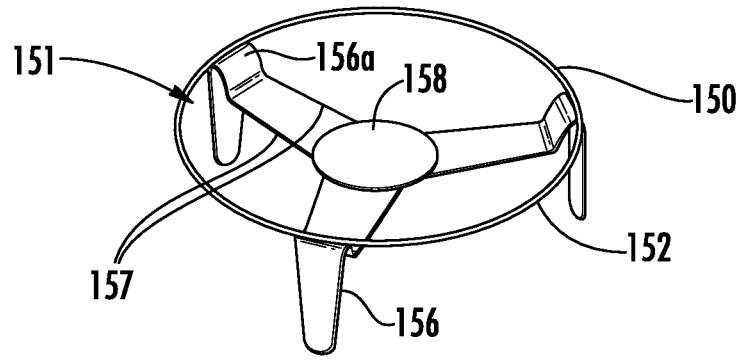

Disclosed herein is a new and improved Food Steamer and Rack System and method of using a Food Steamer and Rack System, which are described with reference to FIGS. 1-4B, wherein like reference numerals refer to like components in the various views.

With particular reference to FIG. 1, a Food Steamer and Rack System 100 may comprise a steamer assembly including vessel 110 for containing a liquid to be heated to create steam. The vessel 100 includes an upper rim 111, a bottom 112, and one or more sidewalls 113 extending between the upper rim 111 and the bottom 112.

The steamer assembly may further include one or more stackable spacer rings. As shown, spacer 120 is dimensioned to be supported on the vessel 110 and includes an upper rim 121, a lower rim 122, and one or more sidewalls 123 forming a perimeter and defining a hollow 126 therebetween. The lower rim 122 is adapted to generally sealingly engage and be supported along the similarly dimensioned upper rim 111 of the vessel 110. One or more handles 125 may be positioned below the upper rim 121 for grasping and maneuvering the spacer 120. The vessel 110 may also optionally include handles (not shown) below rim 111. The sidewall 123 may include one or more flanges 124 that protrude inwardly with respect to the hollow 126. As shown, the flange 124 forms a continuous annular ledge about the sidewall 123. In another embodiment, the sidewall 123 includes two or more flange 124 segments protruding inwardly with respect to the hollow 126. The flange 124 may typically be positioned between the lower rim 122 and the upper rim 121, preferably above and more proximal to the lower rim 122 than the upper rim 121. In another example, the flange 124 extends inward from a position below the lower rim 122.

The steamer assembly may also include one or more perforated plates or racks 140 for supporting food or plates holding food. Perforated rack 140 is selectively positionable within the hollow 126 and supported therein along the flange 124. The perforated rack 140 may define a plurality of perforations and an outer perimeter 144 of sufficient diameter to engage and be supported by the flange 124.

The steamer assembly of the system 100 shown in FIG. 1 includes or is configured to incorporate multiple stackable spacers. Additional spacers 120' and 120" are stacked above spacer 120. Spacer 120' includes an upper rim 121', a lower rim 122', and one or more sidewalls 123' forming a perimeter and defining a hollow 126' therebetween. The lower rim 122' is adapted to generally sealingly engage and be supported along the similarly dimensioned upper rim 121 of spacer 120. Spacer 120' further includes handles 125 for grasping an maneuvering the spacer 120'. Sidewall 123' of spacer 120' also includes one or more flanges 124' protruding inwardly with respect to the hollow 126'. Flange 124' is positioned below the lower rim 122' and is dimensioned to engage and support a perforated rack 140'. In another embodiment, flange 124' may be positioned level with lower rim 122' or between lower rim 122' and upper rim 121'. Perforated rack 140' has a perimeter 144' having a diameter less than the diameter of the hollow 126'. The assembly further includes perforated rack 140". Perforated rack 140" has a perimeter 144" having a diameter greater than the diameter of the hollow 126' and is selectively positionable on upper rim 121'. In another embodiment, sidewall 123' may further include one or more additional flanges for supporting a perforated rack having a diameter less than the diameter of the hollow 126' but greater than the diameter of perforated rack 140'. In such an arrangement, the additional flange may protrude less inwardly than flange 124' and may be positioned between the lower rim 122' and the upper rim 121', more proximate to the upper rim 121'.

Spacer 120" includes a lower rim 122" and one or more sidewalls 126" forming a perimeter and defining a hollow 126" therebetween. Spacer 120" further includes a lid 130 covering one end of the hollow 126". The lower rim 122" is adapted to generally sealingly engage and be supported along the similarly dimensioned upper rim 121' or perforated rack 140". In the illustrated embodiment or another embodiment, lower rim 122" may be adapted to interchangeably generally sealingly engage and be supported along either upper rim 121, 121' (or perforated rack 140" positioned thereon), depending on which spacer 120, 120' is available. Spacer 120" is joined to the lid 130 including a handle 135 such that handle 135 can be used to lift the last spacer 120" and the lid 130 together. The illustrated vessel 110 and spacers 120, 120', 120" are generally cylindrical having generally round perimeters. However, in other embodiments, the vessel 110 and spacers 120, 120', 120" may define other perimeter shapes such as square, rectangular, oval, or other geometric or non-geometric shapes.

The system 100 may further include a stand rack 150 (FIG. 2C) sized to sit on perforated rack 140, 140' to support food during cooking or be used as a service and support device as shown in FIG. 3A-4B. The rack 150 is dimensioned to support and reposition racks 140, 140' from within the hollow 126, 126' of the respective spacer 120, 120' and may have a smaller vertical dimensions than spacers 120, 120'. In one example, the upper portions 156a of legs 156 include supports to engage and support items on the rack 150. The rack 150 may also be placed in vessel 110 and therein used to support a plate or food above boiling or simmering water during steaming, or may be nested in the assembly for compact storage.

Figure 4A:
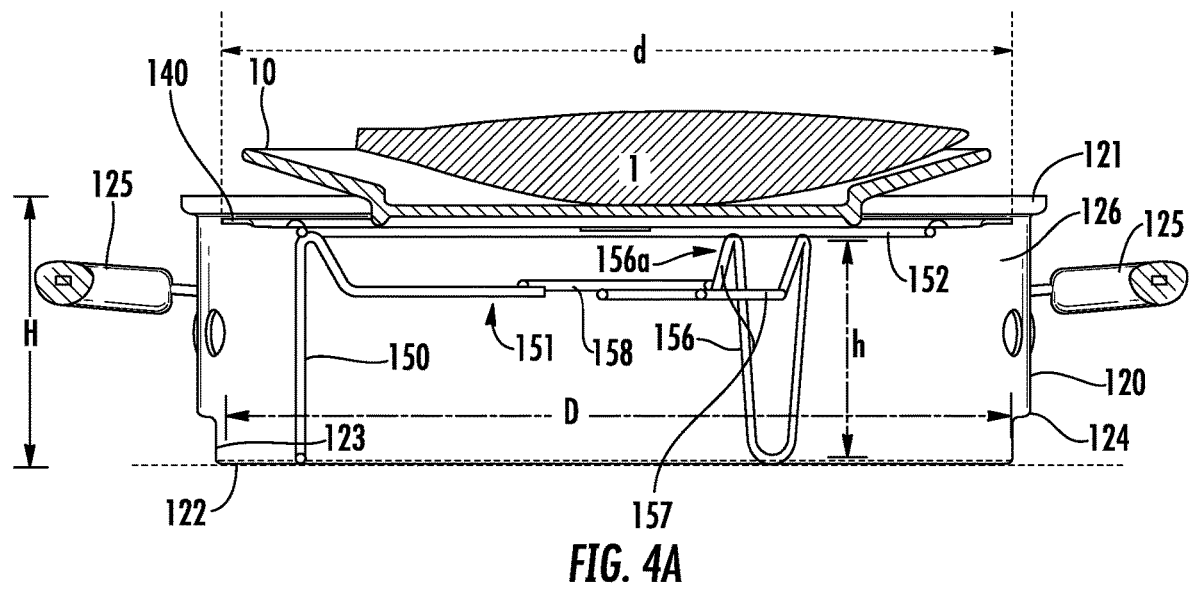
Figure 4B:
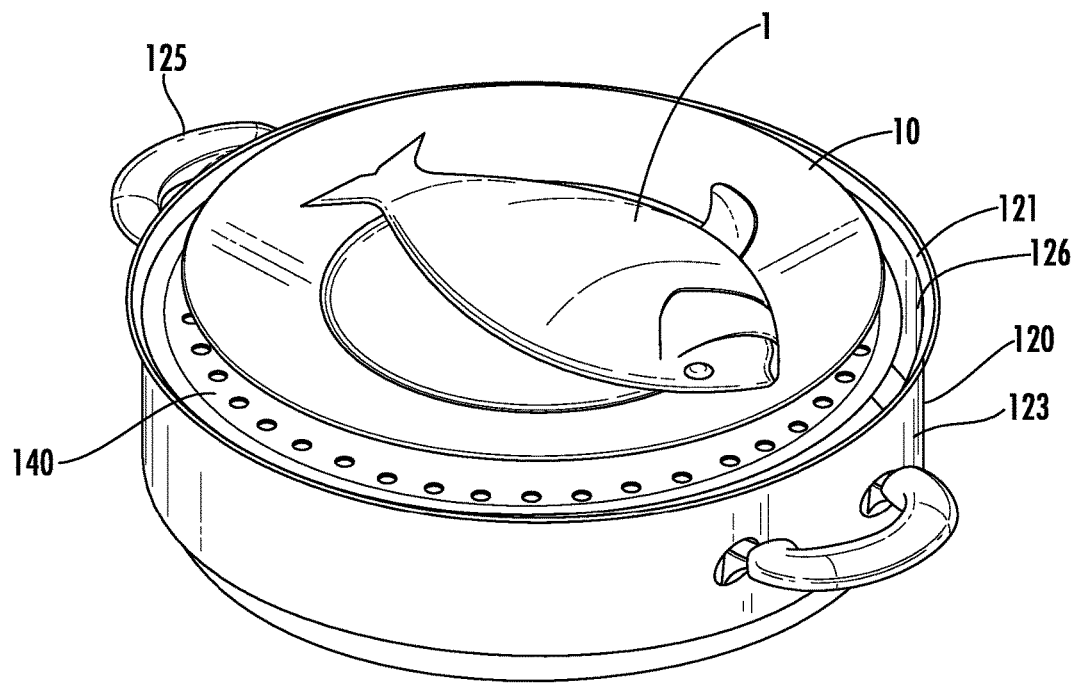
FIG. 4B is a perspective view thereof.

With reference to FIG. 4A, the rack 150 includes a wide upper frame 151 supported by legs 156. The upper frame 151 has a smaller outer diameter (d) than the inner diameter (D) the spacer 120. The upper frame 151 of the rack 150 is disposed a height (h) above the bottom of support legs 156, in which (h) is comparable to or greater than the height (H) of the spacer 120. As a result, a plate 10 may be used to cook food 1 to thereby disposed the food 1 generally above the rim 121 of the spacer 120 for ease of further preparation, such as seasoning, cutting into serving portion, and eventually serving. The upper frame 151 includes one or more supports to supportingly engage items, such as perforated rack 140. In the illustrated embodiment, the supports include an annular rim 152 that attaches to upper portions 156a of legs 156. In further or other embodiments, the upper frame 151 includes different or additional supports positioned to engage items, e.g., prongs, posts, or other suitable supporting structures may be used.

FIG. 3A-3D shows how the rack 150 may be used on a table or counter 20 used for preparation of serving. Specifically, spacer 120, having perforated rack 140 supported therein and further supporting a bowl 12 of steamed food thereon is lifted from the rim 111 of the vessel 110 (FIG. 3A). The spacer 120 is then positioned above the rack 150 (FIG. 3B) and lowered toward the rack 150 so that perforated rack 140 will encounter and be supported by the upper frame 151 of rack 150 (FIG. 3C). The spacer 120, having a larger inner diameter D than the perforated rack 140, can be lowered further (FIG. 3D) until it rests on the table/counter 20, disposing the bowl 12 at a comfortable height above the rim 121 of the spacer 120 for ease of access and presentation of the bowl 12, or the food 1 (see FIG. 4B). In various embodiments, the system 100 may include multiple racks 150, e.g., for supporting multiple perforated racks 140, 140', 140" or other items at the same time. With further reference to FIG. 1, in a similar manner, spacer 120" may be removed from engagement with spacer 120, positioned over rack 150 or a second rack 150, and then lowered to support perforated rack 140' along the upper frame 151. The method may further include grasping handle 135 and lifting spacer 120" from the perimeter 144" of perforated rack 140", upper rim 122, or upper rim 122'.

The illustrated presentation stand or rack 150 defines a generally annular profile and may be formed of metal wire. The rack 150 has three of more legs 156 to provide a stable base for supporting the upper frame 151. The perimeter profile of the rack 150 has a diameter less that the inner diameter of the hollow 126, and, as shown, the legs 156 extend laterally outward about an equivalent distance as the support rim 152. In some embodiments, the legs 156 do not extend outward laterally more than the outer diameter of the upper frame 151; however, in one embodiment, the legs 156 extend laterally beyond the outer diameter of the upper frame 151. The upper frame 151 includes a central hub 158 and three pairs of spokes 157 that connect the hub to the support rim 152 and the upper portion 156a of each leg 156. Each leg 156 includes a doubled over wire that extends to the upper frame 156. The wire may similarly further extend from the upper portion 156a to the hub 158, forming a pair of spokes 157 therebetween. The legs 156 may attach below the upper frame 156. For example, in the illustrated embodiments, legs 156 are coupled together at hub 158 below the support rim 152. The rack 150 illustrated in FIGS. 2C and 4A include spokes 157 that extend at a downwardly directed angle from the support rim 152 and then angle up to approximately horizontal before connecting with the hub 158, thereby forming a recess or bowl. In operation, the perforated rack 140 may rest on the top of the three legs, but a bowl (depending on its size) could rest on the central hub 158, where it may be laterally restrained by the upper frame 151, along the angled spokes 157, the top 156a of the legs 156, the support rim 152, or combination thereof. A larger bowl might only rest on the support rim 152. Thus, supports may include spokes 157, hub 158, or both in addition to or instead of support rim 152. FIG. 3 illustrates another configuration of the rack 150 wherein the spokes 157 and hub 158 extend along the same plane as support rim 152. In this embodiment, the spokes 157 extend generally horizontally between the support rim 152 and the hub 158.

In other embodiments the rack 150 can have other shapes and sizes without departing from the operative principles disclosed above, and can be formed of metal sheet, cast metal, wood, bamboo, ceramic or bent metal wire as shown. Similarly the perforated rack 140 can be formed as a wire frame rack rather than a perforated metal disk, so long as the top of the rack or presentation stand 150 is dimensioned to stably engage and support it. In some embodiments, the perforated rack 140 may include grooves, notches, or other contours or surface features along its lower surface for receiving correspondingly dimensioned supports along the upper frame 151 to more stably position thereon.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A method of using a steamer, the method comprising:
   a) removing a lower rim of a spacer from an upper rim of a vessel adapted to generate steam;
   b) positioning the spacer above a support rack; and
   c) engaging a perforated rack removably retained within an interior hollow of the spacer by lowering the spacer to surround the support rack, wherein the support rack supports the perforated rack when engaged therewith.

2. The method of claim 1,
   wherein the vessel is adapted to retain a fluid and includes a bottom and substantially upright sidewalls extending between the bottom and the upper rim of the vessel;
   wherein the spacer includes one or more generally upright sidewalls forming a perimeter of the spacer and defining the hollow therebetween, wherein, when the spacer is disposed on the vessel, the lower rim of the spacer and the upper rim of the vessel are in generally sealed engagement; and
   wherein the perforated rack stably engages a portion of the sidewall when positioned within the hollow.

3. The method of claim 2, wherein the sidewalls of the spacer include a flange positioned more proximate to the lower rim than the upper rim of the spacer and that extends interiorly with respect to the hollow, and wherein the flange supports the perforated rack when the perforated rack is positioned within the hollow.

4. The method of claim 1, wherein the support rack comprises an upper frame and at least three legs supporting the upper frame, and wherein the upper frame supportively engages the perforated rack when the spacer is lowered to surround the support rack.

5. The method of claim 4, further comprising removing a lid from an upper rim of the spacer before removing the lower rim of the spacer from the upper rim of the vessel.

6. The method of claim 2, further comprising:
   a) removing a lower rim of a second spacer from an upper rim of the first spacer before positioning the first spacer above the first support rack;
   b) positioning the second spacer above a second support rack; and c) engaging a second perforated rack removably retained within an interior hollow of the second spacer by lowering the second spacer to surround the second support rack, wherein the second support rack supports the second perforated rack when engaged therewith.

7. The method of claim 6, wherein the second spacer is adapted to be selectively disposed on the first spacer and comprises one or more generally upright sidewalls forming a perimeter of the second spacer and defining the hollow therebetween, wherein, when the second spacer is disposed on the upper rim of the first spacer, the lower rim of the second spacer and the upper rim of the first spacer are in generally sealed engagement.

8. The method of claim 7, wherein the sidewall of the second spacer includes a flange positioned below the lower rim and that extends interiorly with respect to the hollow, and wherein the flange supports the second perforated rack when the second perforated rack is positioned within the hollow.

9. The method of claim 7, wherein the second support rack comprises an upper frame and at least three legs supporting the upper frame, and wherein the upper frame supportively engages the second perforated rack when the second spacer is lowered to surround at least the upper portion of the second support rack, and wherein the legs position the upper frame at a height greater than a height of the second spacer.

10. The method of claim 6, further comprising removing a lid from an upper rim of the second spacer before removing the lower rim of the second spacer from the upper rim of the first spacer.

11. The method of claim 1, wherein the spacer has an open bottom.

\* \* \* \* \*